INVENTOR.
JOHN M. SLATER

March 28, 1967  J. M. SLATER  3,310,877
VEHICLE OPTICAL ALIGNMENT DEVICE
Filed July 20, 1964  4 Sheets-Sheet 2
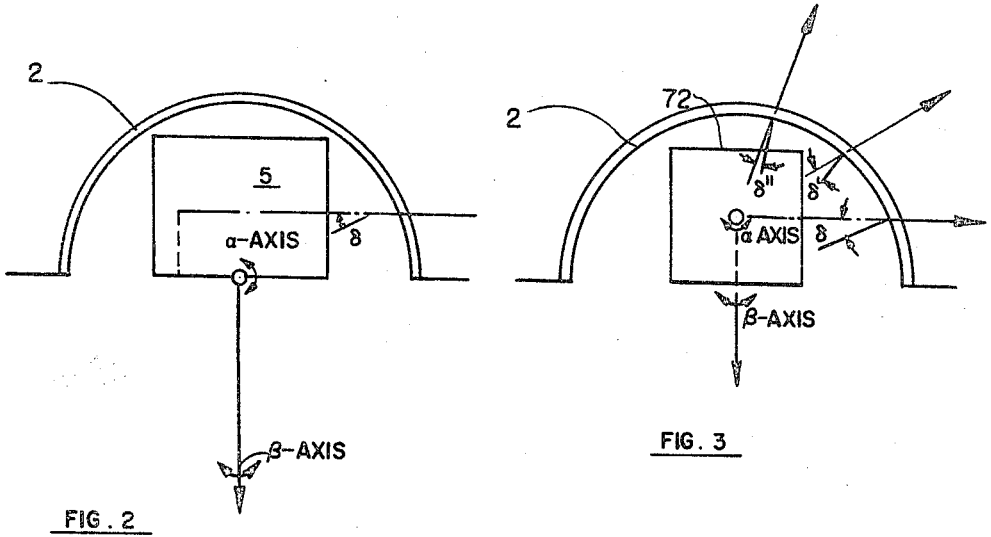
FIG. 2
FIG. 3
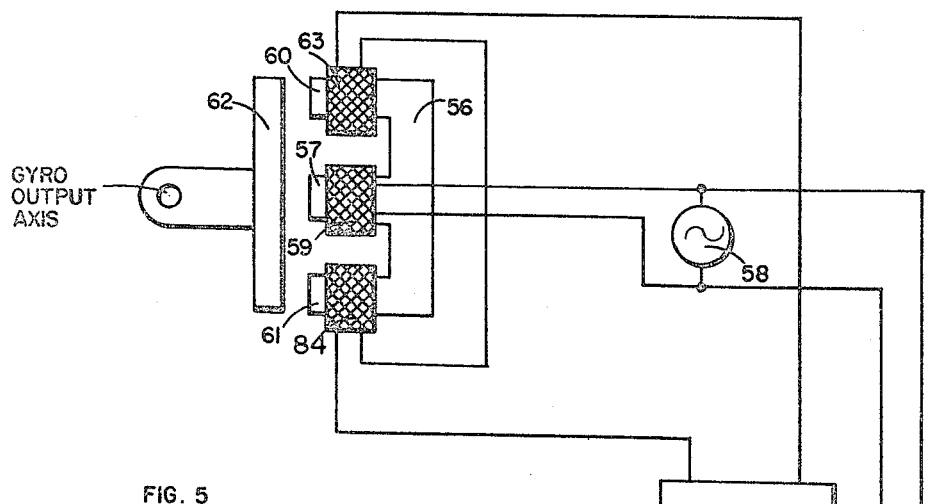
FIG. 5
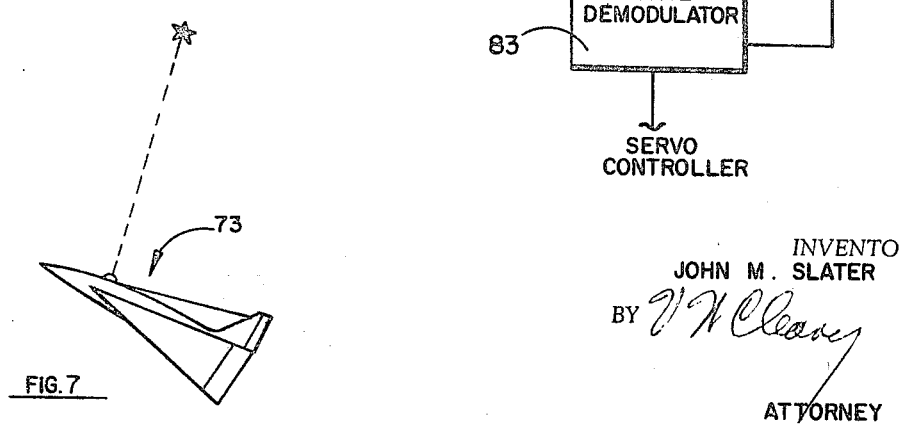
FIG. 7
INVENTOR.
JOHN M. SLATER
BY
ATTORNEY

INVENTOR.
JOHN M. SLATER

INVENTOR
JOHN M. SLATER

United States Patent Office 3,310,877
Patented Mar. 28, 1967

3,310,877
VEHICLE OPTICAL ALIGNMENT DEVICE
John M. Slater, Fullerton, Calif., assignor to
North American Aviation, Inc.
Filed July 20, 1964, Ser. No. 383,693
6 Claims. (Cl. 33—61)

This invention relates to vehicle optical alignment device and more particularly to an alignment system utilizing frame-mounted optical apparatus and inertial equipment.

In the past, optical aligners sensitive to the light rays from stars or other heavenly bodies have usually utilized a stabilized platform on which were mounted the optical device, the gyros, and the accelerometers. The stable element was given three degrees of freedom relative to the vehicle frame by gimbals. In some designs of optical devices, the optical equipment is so large and cumbersome as to make impractical the mounting of the equipment on the stabilized platform. Another disadvantage of the stabilized platform design is that the field of view is limited. To overcome these disadvantages and limitations, it is desirable to mount the optical device on the vehicle frame. When the telescope or other optical device is frame-mounted, the use of a hemispherical dome is practical. It is no longer necessary that elaborate correction factors be incorporated in the design to compensate for the distortion of the light rays as they pass through the glass of the dome.

It will be noted that it is very difficult, if not impossible, to provide a stabilized platform of such design that the telescope gimbal axes, as distinguished from the platform gimbal axes of a stabilized platform, are centered in a dome. Unless the telescope gimbal axes are centered in the dome, there is considerable distortion of the light rays entering the optical system. This distortion varies widely depending on the position and orientation of the optical axis.

A hemispherical dome is perhaps one of the best devices to use as a window in order that a telescope may search and be sensitive to light rays over a complete hemisphere. It is to be noted however that unless the telescope is centered exactly at the center of the hemisphere of the dome there will be considerable distortion of the light rays as they pass through the transparent substance that makes up the dome. This distortion is a result of the difference in radiums between the inner and outer surfaces of the dome. If distortion occurs, or if the angle of distortion varies appreciably with respect to the orientation of the optical axis, it is difficult if not impossible to adequately compensate for the errors introduced into the bearing of the star or other heavenly bodies being tracked by the optical system. However, with frame-mounted systems, it is possible to gimbal the telescope or other optical device in the very center of the dome. There would, therefore, only be a slight negative lens effect of the dome window to be compensated for.

If the frame-mounted telescope is mounted with its optical axis passing directly through the center of the hemispheric dome, it will be apparent that the field of vision of the telescope will be less than a hemisphere; and that there will be a large area at angles of low elevation in which the telescope will be inoperative.

When frame-mounted optical equipment is used in conjunction with stabilized platform-mounted inertial equipment several problems are introduced in measuring the angles between the inner parts of the system. It must be borne in mind that in a ballistic missile guidance system, the overall allowable error is often within a few seconds of arc. First, the platform gimbal structure must be sufficiently rigid so as not to be distorted beyond tolerance under acceleration loads. This is especially difficult when exterior gimbals are used because the rings are inherently flexible. Second, the structure connecting the platform mount and the optical instrument mount must be extremely rigid. This is difficult to accomplish when shock mounting is needed. Third, it is necessary to provide precision angle measuring devices on the platform gimbals to correlate the telescope optical axis with the axes of the inertial instruments. This involves at least five angle measuring devices, two on the telescope and three on the platform gimbal. If the gyros are of the untorqued kind, such as those having electrostatically supported free rotors, additional angle measuring devices may be necessary. It is possible that the errors of the angle measuring devices may be additive in certain attitudes, thus increasing the chance of obtaining prohibitive errors.

The device of this invention is based on the concept that frame-mounted optical equipment is best combined with frame-mounted inertial equipment. The frame-mounted optical-inertial combination is a particularly fortunate system inasmuch as certain shortcomings of frame-mounted inertial systems in point of accuracy as compared with stable platform systems are overcome by optical monitoring and in a relatively simple way. Thus in a ballistic missile guidance system, a frame-mounted inertial system might be relied on to guide the missile up through the overcast with moderate accuracy with regard to azimuth drift; and once through the overcast, the optical system can take over to correct azimuth alignment. The method and apparatus for the correction of such an alignment is well known to those skilled in the art and is not considered to be part of this invention. It is the purpose of this invention to insure that the optical axis of the optical system is aimed in some pre-selected direction in azimuth and elevation for the purpose of intercepting a star or other heavenly body.

It is, therefore, an object of this invention to provide an improved optical alignment device for a vehicle.

It is another object of this invention to provide a relatively small optical system having a maximum viewing area.

It is a further object of this invention to provide a frame-mounted optical system that may be utilized in conjunction with a frame-mounted inertial system.

It is another object of this invention to provide an improved optical device for use as a star tracker.

It is a further object of this invention to provide an optical device, for use with a dome, that will minimize the size of the dome.

It is still a further object of this invention to provide an optical device which can be used with an untorqued gyroscope inertial system.

Other objects of this invention will become apparent from the following description taken in conjunction with the accompanying drawings in which:

FIG. 2 illustrates a second embodiment of the invention.

FIG. 3 illustrates a third embodiment of the invention.

FIG. 5 illustrates a schematic of the angle pickoff and associated electronics.

FIG. 7 illustrates a vehicle with the optical device mounted thereto.

Figure 1:
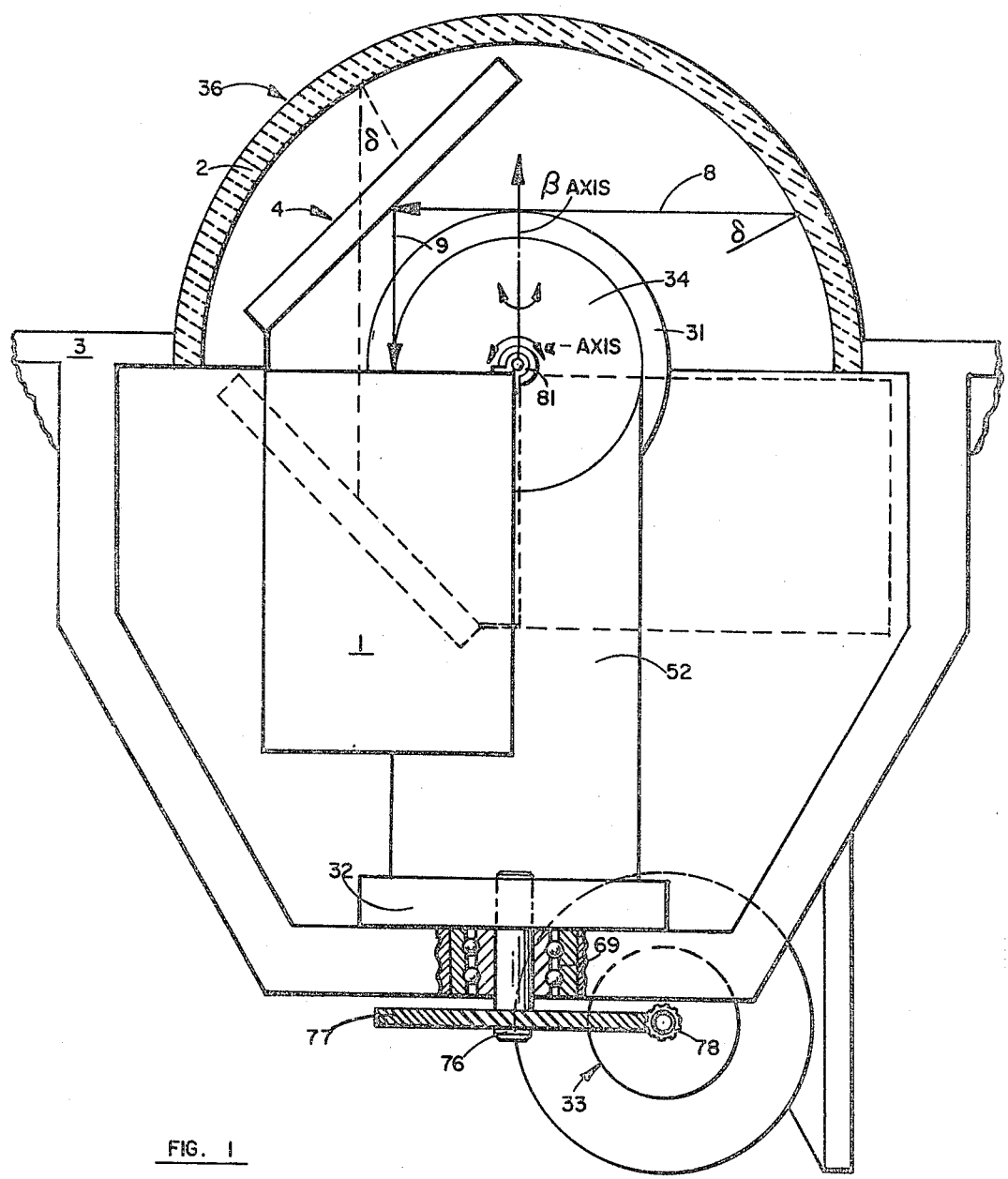
FIG. 1 illustrates a cross sectional view of the preferred embodiment of the invention.

Referring now to the FIGS. 1, 2, 3, and 7, three different mountings of an optical telescope system are shown. In each illustration, the telescope is mounted from the frame 3 of the vehicle with at least two degrees of freedom. The embodiment shown in FIG. 1 is the preferred embodiment of this invention because it provides the maximum field of coverage with a minimum size of dome. In the embodiment of FIG. 1, telescope 1 is pivotally mounted about axes α and β. Axes α and β preferably intersect at the exact center of dome 2 of transparent material. Since telescope 1 is mounted from frame 3 of the vehicle, the positional relationship of axes α and β can be readily maintained.

In the embodiment of FIG. 1, the optical device 36 is mounted to the vehicle frame 3. The telescope is pivotally mounted to a shaft 81, which defines the α-axis of rotation of telescope 1. Shaft 81 is connected to torquer motor 34 and elevation pickoff 31. Pickoff 31 is used to determine the angular displacement of telescope 1 about the α-axis with respect to the reference frame 3. Supporting the pickoff 31 and torquer motor 34 is frame 52 which is connected to shaft 76 and to frame 3 by bearing 69. Shaft 76 defines the β-axis of rotation of telescope 1. Torquer motor 33 is connected by worm gear 78 and drive gear 77 to rotate telescope 1 about the β-axis. Pickoff 32 which is similar in type to pickoff 31 is used to determine the angular position of telescope 1 about the β-axis with respect to the reference frame 3.

It is to be noted that axis 9 of the telescope is offset from the intersection of axes α and β. Plane mirror 4 is attached to the top of telescope 1 and fixedly positioned to deflect light rays from a source thereof (not shown) along axis 8 down optical axis 9 of the telescope. In the preferred embodiment, the surface of mirror 4 is inclined at an angle of 45 degrees with respect to optical axes 8 and 9. Under these conditions with the optical axis of telescope 1 in the vertical position shown, telescope 1 is sensitive to the light rays emanating from a horizontal direction along axis 8. When telescope 1 is rotated 90 degrees about axis α to the position shown by the dotted lines, the telescope is sensitive to light rays from a source which is along a vertical axis. The plane surface of mirror 4 is preferably parallel to axis α. Telescope 1 is mounted to be free to rotate about axis β in a complete circle. The combination of the allowable rotation of telescope 1 about axis α of at least 90 degrees, and the allowable rotation of telescope 1 about axis β of 360 degrees, insures that telescope 1 can be made sensitive to or aimed at any light source within a complete hemisphere.

There are two potential errors in this embodiment which should be compensated for if a highly accurate tracking apparatus is desired. First, there is the error introduced as a result of dome 2 being in effect a lens. This is due to the difference in radius of the outside and inside diameter of the dome. This error is readily compensated for by providing a positive correction in the telescope apparatus by means well known to those skilled in the art and need not be further described here. The second error is introduced as the result of the optical axis of the telescope not being normal to the dome surface. This results in aberrational effects, notably spherical aberration. However, in the system shown in FIG. 1, the incident angle, δ, of the light rays entering telescope 1 is always the same relative to the normal regardless of the position of the optical axis in azimuth or elevation. Therefore, the spherical aberration due to nonorthogonality can be readily compensated for by a corrector plate in telescope 1.

In the embodiment shown in FIG. 2, telescope 5 is mounted for two degrees of angular freedom by a structure similar to that shown in FIG. 1. The telescope 5 is mounted with the α axis located midway down its side. In this embodiment, telescope 5 is not provided with any plane mirror; and therefore, in order to obtain a complete coverage of the entire hemisphere, the telescope must be rotatable into dome 2. It is, therefore, apparent that although the correction factors for the lens effect due to spherical aberration are the same for the embodiments shown in FIGS. 1 and 2, the dome of FIG. 2 must necessarily be made larger in order to accommodate the rotation of the telescope proper into the hemisphere. Inasmuch as the weight of domes increases in proportion to the cube of the radii and the costs of construction of domes increase at an even higher power of the radii, any decrease of radius of the dome is highly desirable.

In the optical alignment device shown in FIG. 3, a telescope of "squarish" build is mounted for two degrees of angular freedom by a structure similar to that shown in FIG. 1. The telescope 72 has its optical axis passing through the intersection of axes α and β. It is noted that the intersection of axes α and β is not at the center of dome 2. This results in a complicated distortion of the aberration effect due to the telescope's axis not maintaining a constant angle δ relative to the normal. The angle δ in this case varies with the elevation angle. It is very difficult to compensate for this aberration error due to the variation in the angle with elevation.

From the foregoing, it can be readily seen that offsetting the telescope from the center of the dome results in great ease in compensating for the negative lens effect and the spherical aberration. Combining the offset position of the telescope and the plane mirror results in further reduction in the weight and cost of the dome.

A frame mounted inertial device which may be used in conjunction with the frame-mounted telescope is described in U.S. Patent No. 3,164,340 entitled "Inertial Guidance System Using Vehicle-Fixed Inertial Elements," by J. M. Slater et al.

Figure 4:
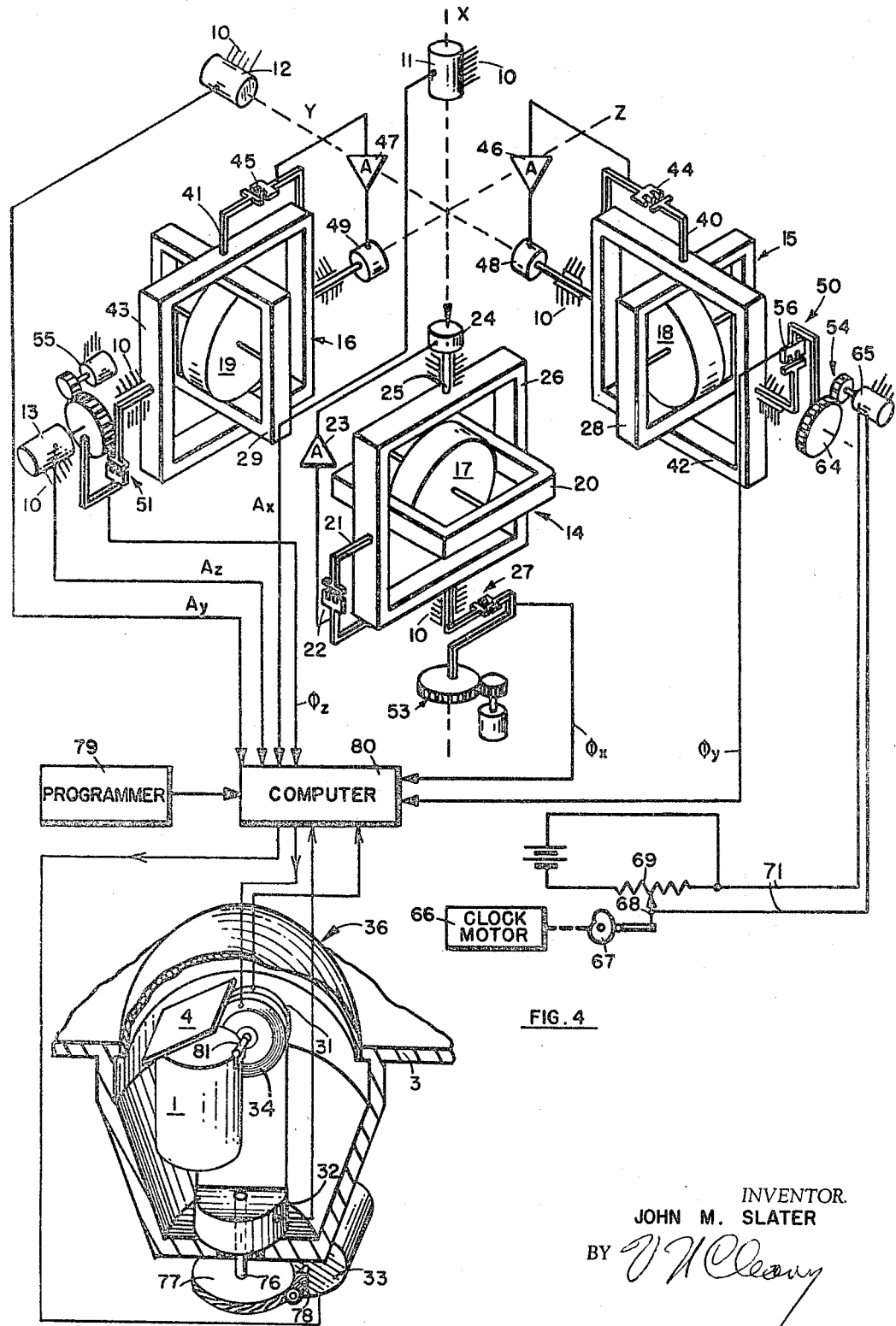
FIG. 4 illustrates the preferred embodiment of this invention.

Referring now to FIG. 4, the inertial elements utilized in the present invention are mounted on base 10, which may be the airframe itself or a separate frame which is attached to the airframe by means of shock-mounts, etc., in such a manner as to preserve a substantially fixed orientation of the base member relative to the airframe. On the base 10, there are mounted three linear acceleration sensing devices 11, 12 and 13 with their sensing axes disposed respectively along the mutually orthogonal airframe axes $x$, $y$ and $z$. These acceleration sensing devices may be non-integrating accelerometers or velocity meters (accelerometers combined with integrators in known ways). For purposes of illustration non-integrating accelerometers are selected. They may be of the type disclosed in the article by J. M. Slater and D. B. Duncan entitled "Intertial Navigation" published in the Aeronautical Engineering Review, vol. 15, No. 1, January 1956, p. 49.

The outputs of the accelerometers are electrical signals proportional to the respective acceleration components $A_x$, $A_y$ and $A_z$ along their respective sensing axes. Also, mounted on base 10 are three single axis gyroscopes 14, 15 and 16 having rotors 17, 18 and 19, respectively. Rotor 17 of gyroscope 14 is mounted in gimbal 20 defining output axis 21. Pickoff 22 on axis 21 detects the angle of precession about the output axis and controls, through servo controller 23, servo-motor 24 on gyroscope input axis 25. Axis 25 is defined by the support axis of outer gimbal 26. Inner gimbal 20 is supported from outer gimbal 26 along axis 21. In the standard nomenclature for single axis gyroscopes, the type shown herein, support axis 21 of gyroscope gimbal 20 is termed the output axis or precession axis. By construction, the spin reference axis (the axis of rotation of rotor 17) is established at right angles thereto. The spin reference axis is established by the position of the output axis pickoff. The direction of the spin reference axis is shown in its normal underflected position in FIG. 4. The input or sensing axis 25 is defined as the axis at right angles to both the output and spin reference axes. The single axis gyroscope tends to remain angularly fixed in space against rotation with respect to its input axis. Any disturbing torque acting about the input axis is sensed by the gyroscope and produces an output axis precession which is sensed by the output axis pickoff to cause the servo system including controller 23 and motor 24 to generate a counter torque which cancels the disturbing torque. Angle pickoff 27 on the gyro input axis detects the angular departures of the airframe or other movable index with respect to the fixed position of gyroscope 14. The pickoffs illustrated are of a limited range type which is considered adequate. If the airframe is expected to have angular perturbations as by reason of a slow acting autopilot, for example, there will be provided synchros or other devices capable of providing a signal which is linear for several degrees of displacement. The signal from pickoff 27 is thus proportional to perturbation angle $\phi_x$.

The orthogonally oriented gyroscopes 15 and 16 are similar to gyroscope 14 and include inner gimbals 28 and 29, outer axes 40 and 41, outer gimbals 42 and 43, precession detecting pickoffs 44 and 45, servo-controllers 46 and 47, servo motors 48 and 49 and input axis pickoffs 50 and 51. Thus, the angle pickoffs 50 and 51 detect angular departures of the airframe or movable index with respect to the fixed positions of gyroscopes 15 and 16, respectively, to provide signals respectively proportional to perturbations $\phi_y$ and $\phi_z$.

In the general case, the airframe is controlled through angular maneuvers of substantial magnitude relative to all three of its axes, $x$, $y$, and $z$. Accordingly, angle drives 53, 54 and 55 are provided for programming large angular changes for all three gyroscopes.

As indicated in FIG. 4, the pickoff core 56 is driven through gearing 64 by means of a motor 65 (gyro 15) which is energized by a programmed signal. The programmed signal may be obtained via leads 71 by means of a clock motor 66 driving at a constant speed a cam 67 which has the surface thereof formed in accordance with the desired programmed angle. In the program drive for the gyroscope 15, the programmed angle is the elevation angle. The cam 67 drives wiper 68 of potentiometer 69 to provide the motor 65 with the desired program signal.

The program signal is of such a magnitude and direction as to keep the angular difference between the pickoff elements within physical limits.

For example, the clock motor 66 may be of the type used on telescopes to keep the telescope aligned with the movement of a star. Disclosed in the aforementioned patent to J. M. Slater, et al., is a more sophisticated discussion and solution to the problem of large angular displacements which occur over a fairly long time period.

As illustrated in FIG. 5, each pickoff may be comprised of an E shaped core 56 made from magnetic material and having a center leg 57 which is energized from source of electrical energy 58 through coil 59. Sensing coils 63 and 84 are series wound on outer legs 60 and 61 of E core 56 to provide an induced output signal proportional to the difference between the flux flowing in the respective outer legs. Arm 62 is made from magnetic material and is fixed to the gyro output axis to move therewith relative to the outer legs of E core 56, whereby the flux difference in the outer legs is varied in accordance with the relative movement between arm 62 and outer legs 60 and 61. The signals from the sensing coils on the outer legs of the core are fed through phase sensitive demodulator 83 to provide a signal having a phase and magnitude proportional to the direction and magnitude of the relative rotation between arm 62 and E core 56.

Figure 6:
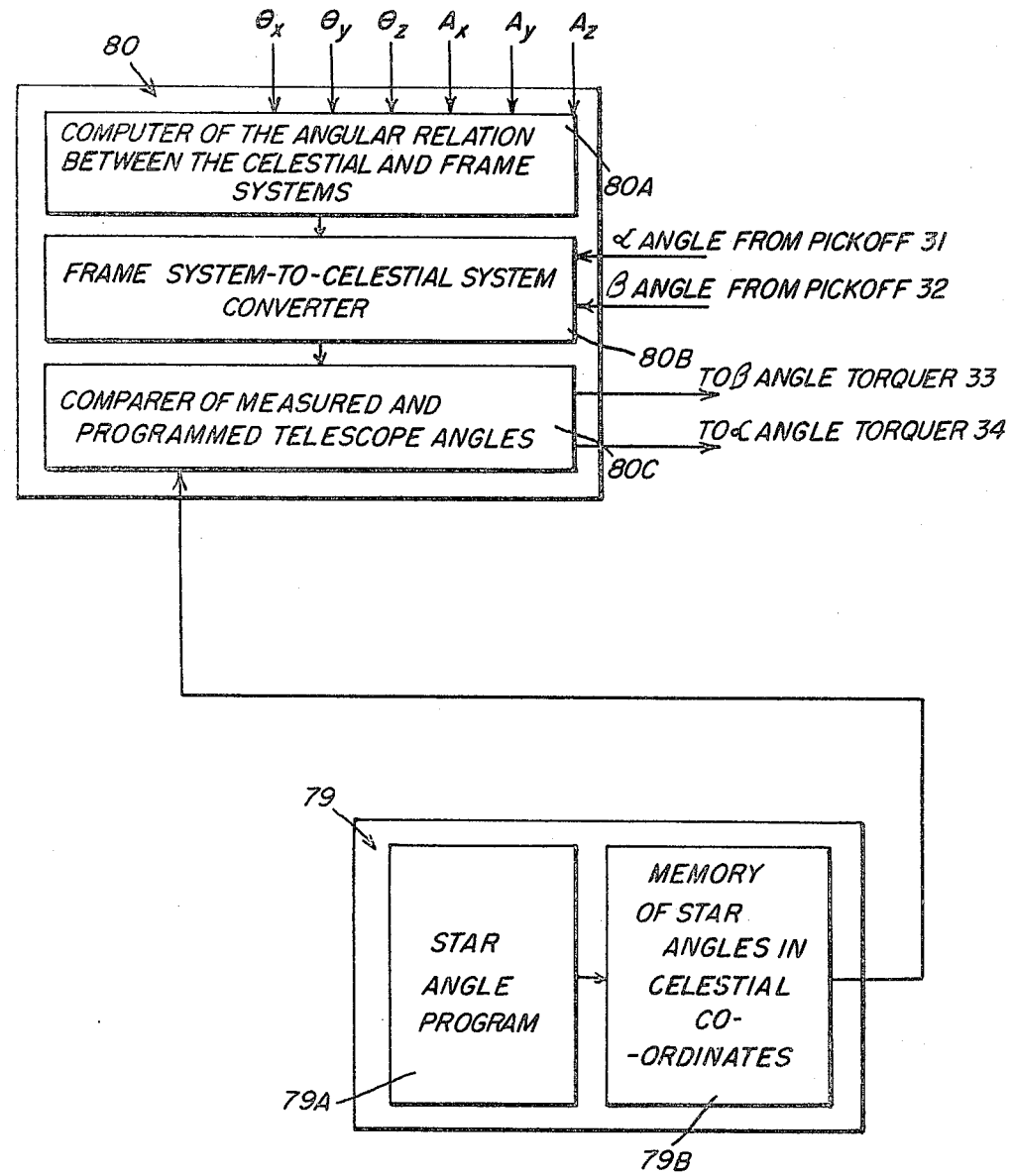
FIG. 6 illustrates, in block diagram form, a computer and programmer which may be used with the invention.

Computer 80 receives the signals $A_x$, $A_y$, and $A_z$ from accelerometers 11, 12, and 13 respectively and the signals $\phi_x$, $\phi_y$, and $\phi_z$ from gyroscope input axis pickoffs 27, 50 and 51 respectively. Computer 80 utilizes the inputs above described to compute a variable relationship between the frame axes and the celestial axes. This information is utilized to continuously correlate the azimuth and elevation angles of the optical axis with the desired bearing of a celestial body which is programmed into the computer from programmer 79. Referring to FIG. 6, memory-programmer 79 is comprised of a memory unit 79B in which the bearings of numerous different celestial bodies are stored and a star-angle programmer 79A. The stored bearings are sent to the angle comparer 80C in celestial coordinates. The angle comparer 80C determines the difference between the telescope angles in celestial coordinates from converter 80B and the star angle in celestial coordinates from memory unit 79B. The difference in angles results in an error signal which is fed to telescope torquers 33 and 34 to rotate the telescope into position. Computer 80A converts the frame reference coordinates into celestial coordinates and provides to converter 80B the correct reference coordinates. The converter 80B receives the frame angles of the telescope from pickoffs 31 and 32 and converts these angles into celestial coordinates. It is, therefore, necessary either to convert the bearings in celestial coordinates to the bearings in frame coordinates or else to convert the bearing of the optical axis given in the frame coordinates into celestial coordinates. The latter option is assumed in the description following: When both bearings are given in the same coordinate system, they can be compared and any errors detected may be corrected.

Accelerometers 11, 12 and 13 provide signals which include acceleration components which are due to the changes of the velocity vector of the vehicle in the frame coordinate system and also include acceleration components which are due to gravity and the effects of the angular velocity of the frame coordinate system in inertial space. These acceleration components are designated $A_x$, $A_y$, $A_z$. In addition, the inertial reference system produces signals proportional to the angular perturbations about the $x$, $y$, and $z$ axes. These signals are obtained from pickoffs 27, 50 and 51 respectively and are designated $\phi_x$, $\phi_y$, and $\phi_z$. It is thus noted that the frame mounted inertial reference system of this invention produces signals which are proportional to the acceleration along and the amount of rotation of the inertial system about the $x$, $y$, and $z$ axes of the frame oriented coordinate system. The optical system 36 is also provided with at least two pickoffs. Pickoff 31 continuously signals the angles of elevation of the optical axis of the telescope with respect to the frame oriented coordinate system. Pickoff 32 continuously signals the bearing in azimuth of the optical axis of the telescope system with reference to the frame oriented coordinate system. Torquers 33 and 34 are positioned to change the alignment of the optical axis of the optical system in response to input signals from computer 80.

As previously mentioned, memory-programmer 79 is a computer which includes a memory catalog of stars in terms of their celestial space coordinates. It has as an output signals which are proportional to the bearing of a selected star with respect to celestial coordinates. The usual practice is to alternate between two or more stars on different bearings to thereby obtain a navigational fix of the position of the vehicle. It is not the purpose of this invention to describe the methods by which a navigational fix can be obtained. Such means are well known to those skilled in the art and need not be described here.

It is, therefore, apparent that it is necessary, if we adapt the option referred to above, to convert the bearing of the optical axis signaled by the pickoffs 31 and 32 in terms of the frame coordinate system which is essentially a continuously changing or rotating coordinate system with reference to the inertial or celestial coordinate system into signals which are proportional to the bearing of the optical axis with reference to the inertial coordinate system. The bearing in celestial elevation and azimuth can then be compared with the known bearing of the desired star in the celestial coordinate system and any errors in that bearing in either elevation or azimuth can be coupled back to torquers 33 and 34 to realign the optical axis of optical system 36 in the desired direction.

Although the invention has been described and illustrated in detail, it is to be clearly understood that the same is by way of illustration and example only and is not to be taken by way of limitation, the spirit and scope

I claim:

1. In combination a dome of transparent material subtending a substantial portion of a hemisphere, a telescope, means for gimballing said telescope about inner and outer orthogonal axes intersecting at the center of curvature of said hemisphere and displaced laterally from the telescope optical axis, and a substantially flat mirror fixedly mounted on said telescope and inclined with respect thereto about an axis parallel to the inner gimbal axis at a predetermined angle, such that the effective optical axis of the telescope makes a constant finite angle $\delta$ relative to a line normal to the dome.

2. An optical alignment device for a vehicle comprising a dome mounted on the surface of said vehicle, an optical system comprising a telescope, having an optical axis and a substantially flat mirror fixedly mounted to said telescope at a predetermined angle, means for supporting said optical system from the frame of said vehicle with freedom of rotation about two perpendicular intersecting axes, the intersection of said axes being substantially at the center of curvature of said dome and the optical axis of said optical system being off-set a predetermined distance from said center of curvature of said dome.

3. An optical aligning device for a vehicle comprising a dome of transparent material of substantially hemispherical shape; an optical system comprising a telescope having an optical axis and a substantially flat mirror fixedly mounted from said telescope with said mirror being inclined at a preselected angle so as to intersect said optical axis; means for supporting said optical system with freedom of rotation about two orthogonal axes intersecting substantially at the center of curvature of said dome and displaced a predetermined distance from said optical axis.

4. An optical aligning device for a vehicle comprising a dome of transparent material of uniform thickness shaped as a zone of a sphere; an optical system, comprising a telescope having an optical axis and a substantially flat mirror fixedly mounted to said telescope at a predetemined angle; means for gimballing said optical system about two orthogonal axes intersecting substantially at the center of curvature of said dome so as to minimize aberration effects and displaced laterally from said optical axis.

5. An optical alignment device for a vehicle comprising a dome of transparent material shaped as a zone of a sphere and mounted on the surface of said vehicle; an optical system comprising a telescope, and a substantially flat mirror fixedly mounted to said telescope at a predetermined angle, said telescope having an optical axis; and means for supporting said optical system from the frame of said vehicle with freedom of rotation about two intersecting orthogonal axes, one of which is substantially tangent to the surface of said vehicle, the point of intersection of said orthogonal axes being substantially at the center of curvature of said dome, the optical axis of said optical system being displaced a preselected distance from said center of curvature of said dome.

6. An optical alignment device for a vehicle comprising a dome of transparent material shaped substantially as a hemisphere and mounted on the surface of said vehicle; a telescope having an optical axis; means for supporting said telescope from the frame of said vehicle with freedom of rotation about two intersecting orthogonal axes, one of which axes is substantially tangent to the surface of said vehicle, the point of intersection of said orthogonal axes being substantially at the center of curvature of said dome and the optical axis of said telescope being displaced a preselected distance from said center of curvature of said dome; and a substantially plane mirror supported in fixed relationship with said telescope optical axis with the plane of said mirror inclined at a preselected angle to and intersecting said optical axis, the plane of said mirror being substantially parallel to said tangent axis of said telescope support means.

References Cited by the Examiner

UNITED STATES PATENTS

| | | | |
|---|---|---|---|
| 1,190,719 | 7/1916 | Buff | 33—61 |
| 1,563,484 | 12/1925 | Gunn | 33—61 |
| 2,523,577 | 9/1950 | Laverdure | 88—72 X |
| 2,583,033 | 1/1952 | Weiss | 33—69 |
| 2,718,704 | 9/1955 | Mariani | 33—69 |
| 2,738,591 | 3/1956 | Spencer et al. | 33—225 |
| 2,922,224 | 1/1960 | Gray | 33—222 X |
| 3,015,249 | 1/1962 | Taylor | 33—61 |
| 3,037,289 | 6/1962 | Gabarini et al. | 33—222 X |
| 3,204,523 | 9/1965 | Daily | 88—72 |
| 3,214,575 | 10/1965 | Seliger et al. | |

ROBERT B. HULL, *Primary Examiner.*